(12) United States Patent
Bigolin

(10) Patent No.: US 7,500,717 B2
(45) Date of Patent: Mar. 10, 2009

(54) ADJUSTABLE SADDLE CONSTRUCTION FOR BICYCLES

(75) Inventor: Giuseppe Bigolin, Vicenza (IT)

(73) Assignee: Selle Italia S.r.l., Rossano Venelo (Vicenza) (IT)

( * ) Notice: Subject to any disclaimer, the term of this patent is extended or adjusted under 35 U.S.C. 154(b) by 0 days.

(21) Appl. No.: 11/803,246

(22) Filed: May 14, 2007

(65) Prior Publication Data

US 2008/0018148 A1 Jan. 24, 2008

(30) Foreign Application Priority Data

Jul. 19, 2006 (IT) .......................... MI2006A1404

(51) Int. Cl.
*B62J 1/10* (2006.01)
*B62J 1/00* (2006.01)

(52) U.S. Cl. .................................. 297/201; 297/215.14

(58) Field of Classification Search ................. 297/201, 297/215.14
See application file for complete search history.

(56) References Cited

U.S. PATENT DOCUMENTS

| | | | | | |
|---|---|---|---|---|---|
| 4,563,038 | A | * | 1/1986 | Hirose | 297/201 X |
| 5,203,606 | A | * | 4/1993 | Granzotto | 297/201 |
| 6,827,397 | B1 | * | 12/2004 | Driver | 297/215.14 |
| 7,121,622 | B1 | * | 10/2006 | Mendez | 297/201 |

* cited by examiner

*Primary Examiner*—Rodney B. White
(74) *Attorney, Agent, or Firm*—James V. Costigan; Hedman & Costigan, P.C.

(57) ABSTRACT

An adjustable saddle construction, particularly designed for bicycles, comprises a saddle rear part and a saddle front part or tip, removably coupled to the saddle rear part, so as to define at least two discrete positions, i.e. a raised position and a lowered position.

4 Claims, 3 Drawing Sheets

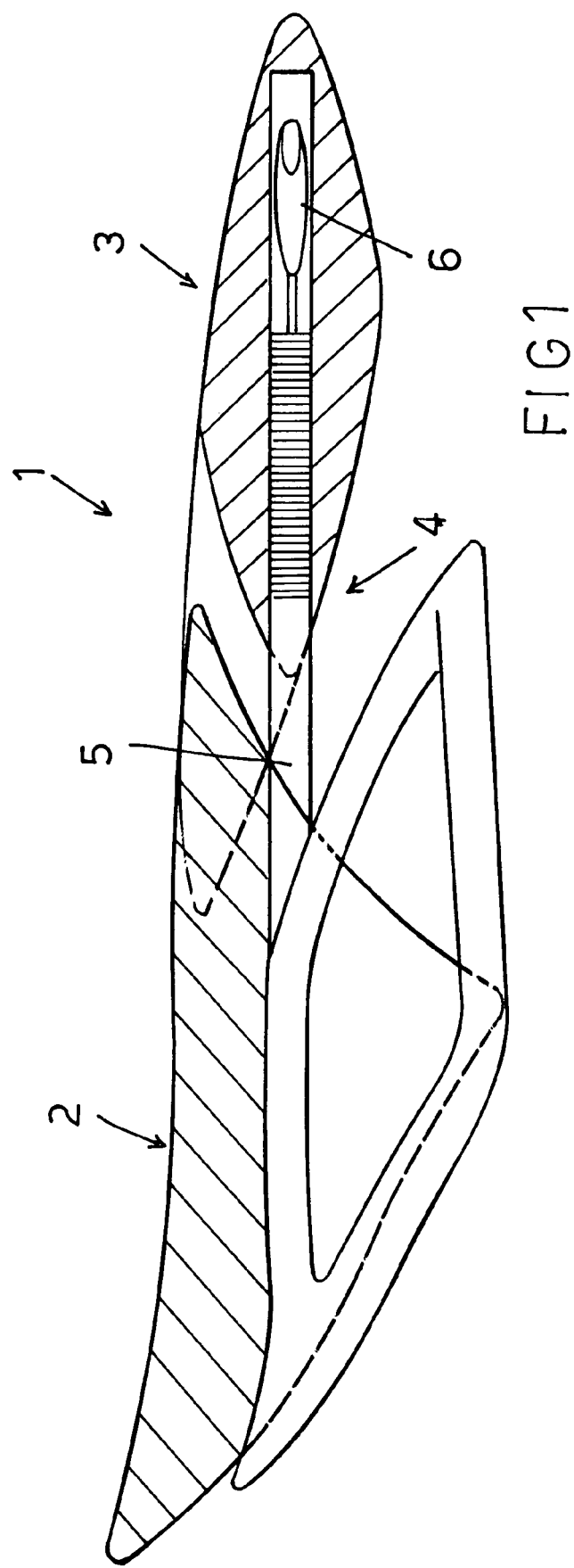

ADJUSTABLE SADDLE CONSTRUCTION FOR BICYCLES

BACKGROUND OF THE INVENTION

The present invention relates to an adjustable saddle construction, specifically designed for bicycles.

SUMMARY OF THE INVENTION

The aim of the present invention is to provide such a bicycle saddle construction, allowing to adjust or modify the saddle tip bearing region, according to the saddle user requirements.

Within the scope of the above mentioned aim, a main object of the invention is to provide such a bicycle saddle construction, allowing to modify the saddle seating properties, in a very quick and easy manner.

Yet another object of the present invention is to provide such a bicycle saddle construction having novel aesthetic and "styling" design features.

According to one aspect of the present invention, the above mentioned aim and objects, as well as yet other objects, which will become more apparent hereinafter, are achieved by a bicycle adjustable saddle construction, characterized in that said saddle construction comprises a saddle construction rear part and a saddle construction front or tip part, removably associated with said rear part thereby defining at least two discrete positions, a raised position and a lowered position of said saddle construction.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative example, in the accompanying drawings, where:

FIG. 1 is a side elevation view, as longitudinally cross-sectioned, of the adjustable saddle construction according to the present invention;

FIG. 2 is a further side view illustrating the saddle construction with the saddle construction tip part downward turned;

DESCRIPTION OF THE PREFERRED EMBODIMENTS

Figure 3:
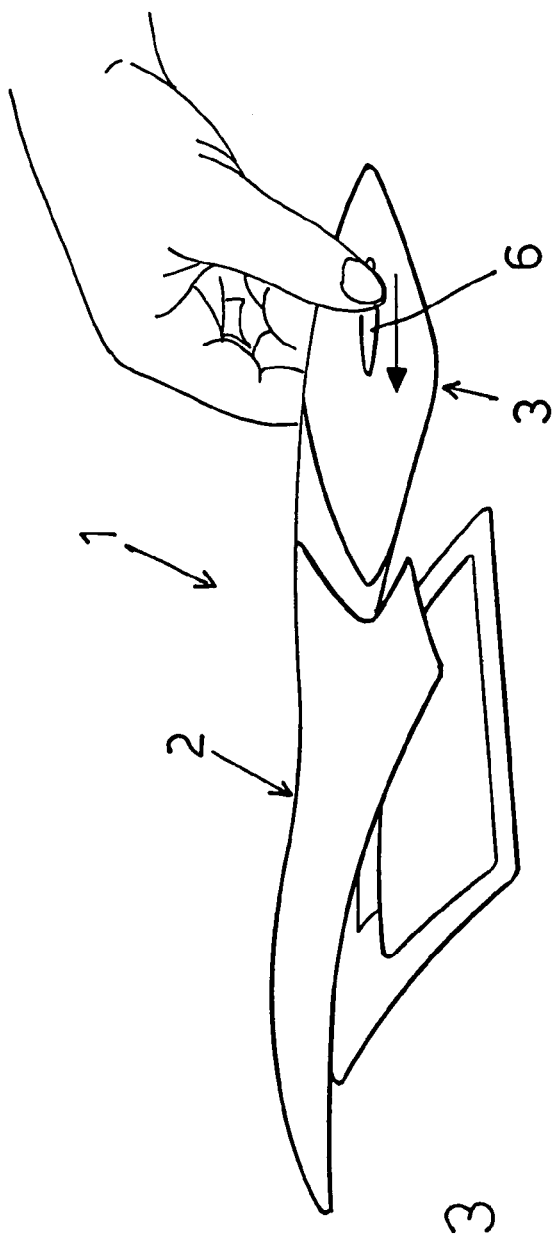
FIG. 3 is a further side elevation view showing a first operating step for withdrawing the saddle construction tip.
Figure 4:
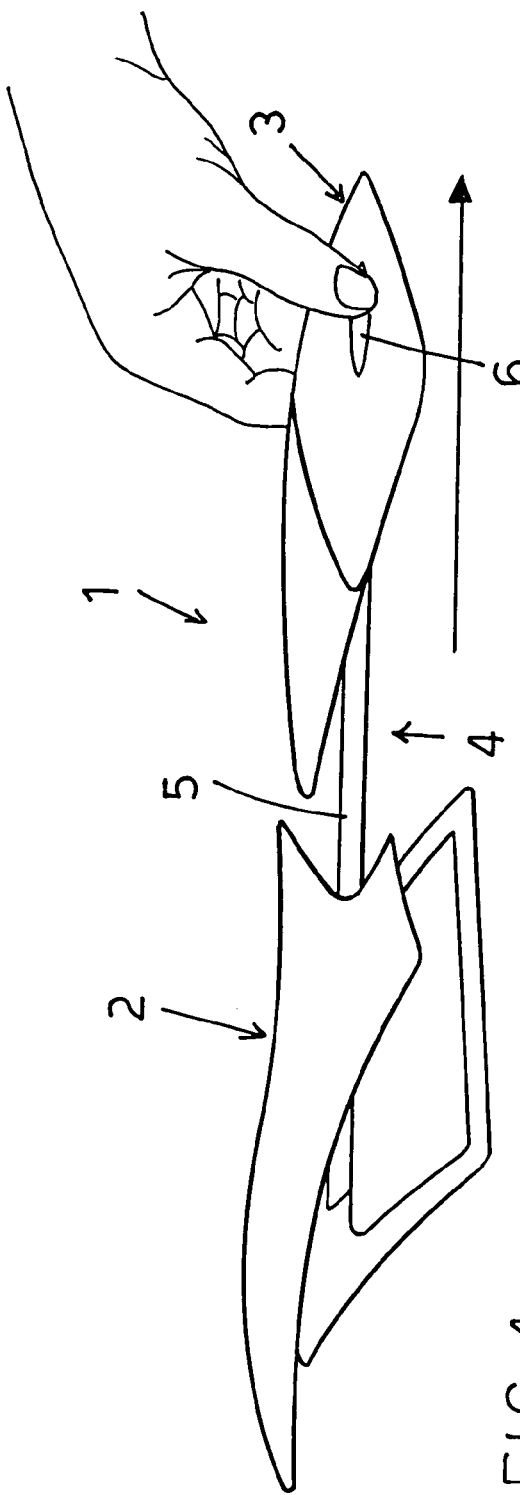
FIG. 4 is a schematic view similar to FIG. 3, showing a further withdrawing operating step.
Figure 5:
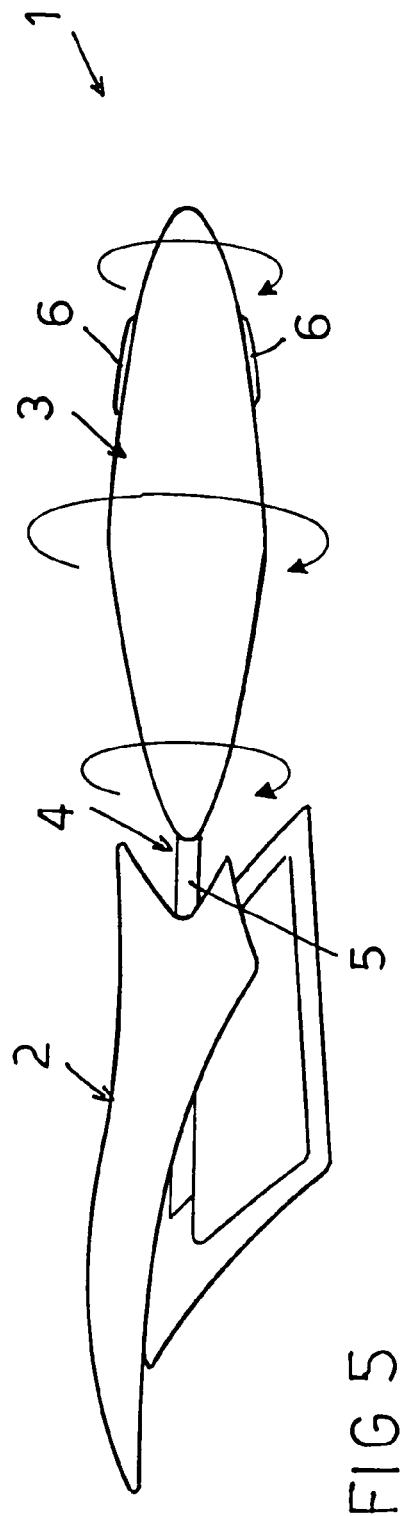
FIG. 5 is a view similar to FIG. 4, showing a further operating step for causing the saddle tip part or portion to rotate.
Figure 6:
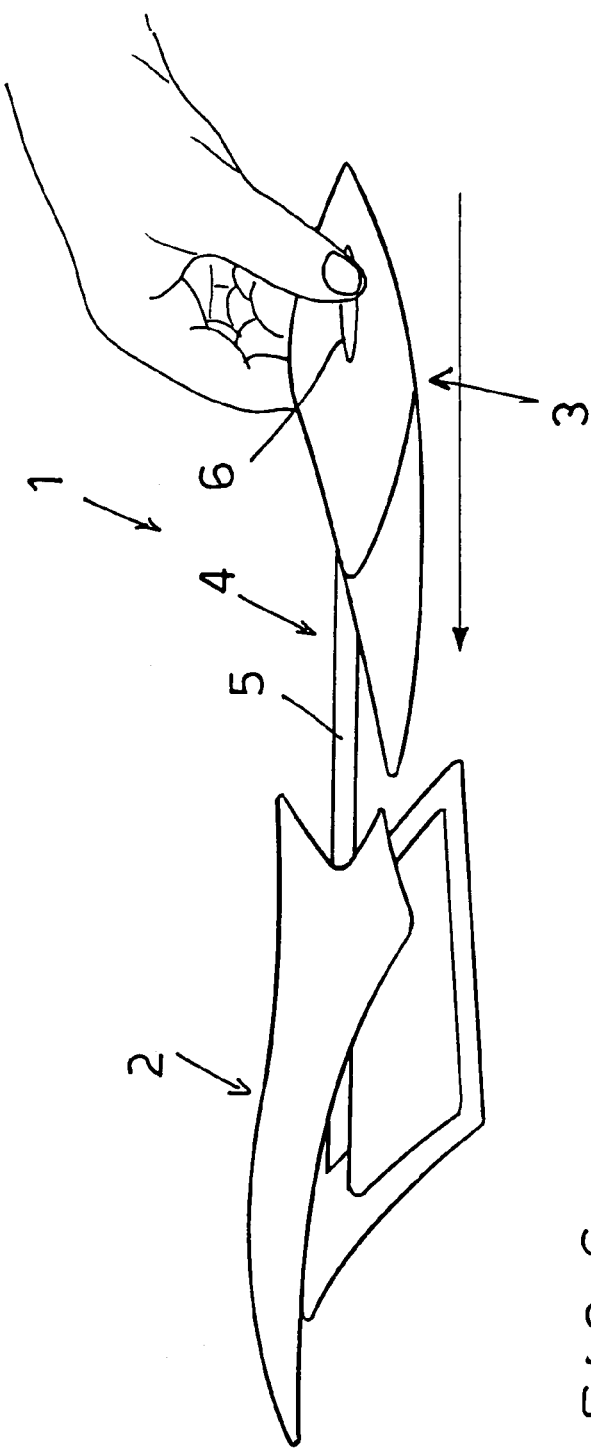
FIG. 6 is a view similar to FIG. 5, showing a further operating step for engaging the saddle tip part or portion into the saddle rear body.

With reference to the number references of the above mentioned figures, the adjustable saddle construction according to the present invention, which has been generally indicated by the reference number 1, comprises a saddle rear part or portion 2 and a saddle front or tip part or portion 3.

More specifically, said rear part 2 substantially corresponds to a conventional seating region of a conventional type of saddle, i.e. to the bearing region of the ischiatic bone and glutei.

The front part 3, corresponding to the tip portion of a prior or conventional saddle, is removably coupled, according to the present invention, to the saddle rear portion or part 2 by coupling means 4, allowing the tip part 3 of the saddle to be connected to the saddle rear part 2, to allow the saddle tip part 3 to assume at least two discrete positions, with respect to the saddle rear part 2, that is a raised position and a lowered position.

Preferably, the connection or coupling means 4 comprise a bayonet type of coupling.

The latter is constituted by a connecting rod 5, made integral or rigid with the rear body 2 and thereon the tip part 3 can slide and turn.

The sliding and turning movement of the tip part 3 on the rod 5 can be locked by a locking lever 6.

The main feature of the saddle construction according to the present invention is that it is herein possible to turn through 180° the tip part 3 with respect to the longitudinal axis of the saddle, through the bayonet coupling 4.

Thus, the saddle construction according to the present invention is adapted to provide the user with two tip bearing regions, depending on the turning or rotary movement, for a same seating region.

As shown in the drawings, the tip part 3, which has a curved configuration, can be locked on the rear part 2 with its front end portion upward directed, that is in a raised condition, or with said front end portion downward directed, that is in a lowered condition.

Thus, by arranging the tip part in one of the two above mentioned operating conditions, either a raised or a lowered condition or position, it is possible to easily change the front bearing characteristics of the saddle, thereby fitting the seating to the requirements of the user.

It has been found that the invention fully achieves the intended aim and objects.

In fact, the invention provides a saddle construction which, with respect to a conventional saddle construction, provides a possibility of easily and quickly modify the tip bearing region, according to the user requirements.

A further important advantage of the present invention is that the seating properties can be easily and quickly modified by a quick and easy operation.

A further advantage of the present invention is that the subject saddle construction has very good aesthetic characteristics.

In practicing the invention, the used materials, as well as the contingent size and shapes, can be any, depending on requirements.

The invention claimed is:

1. An adjustable saddle construction for a bicycle, said saddle construction comprising a saddle rear part substantially corresponding to a region bearing ischiatic bones and glutei of a user of said bicycle, and a saddle front part, removably coupled to said rear part by coupling means including a bayonet joint, thereby providing at least two discrete positions, in particular a raised and a lowered position, wherein said bayonet joint comprises a connecting rod, made rigid with a rear body of the saddle and on which said front part may slide and turn.

2. An adjustable saddle construction, according to claim 1, wherein said front part can be locked on said connecting rod by a locking lever.

3. An adjustable saddle construction, according to claim 1, wherein said front part can be rotatively driven through 180° with respect to a longitudinal axis of said saddle construction.

4. An adjustable saddle construction, according to claim 1, wherein said front part has a curved configuration and can be locked, with respect to said rear part, either a front end portion of said front part in a raised condition, or with said front end portion in a lowered condition.

* * * * *